F. R. PACKHAM.
CORN PLANTER.
APPLICATION FILED JUNE 30, 1911.

1,016,766.

Patented Feb. 6, 1912.

3 SHEETS—SHEET 1.

Witnesses
Oliver T. Clarke
Chas. I. Welch

Inventor
Frank R. Packham

By
Attorneys

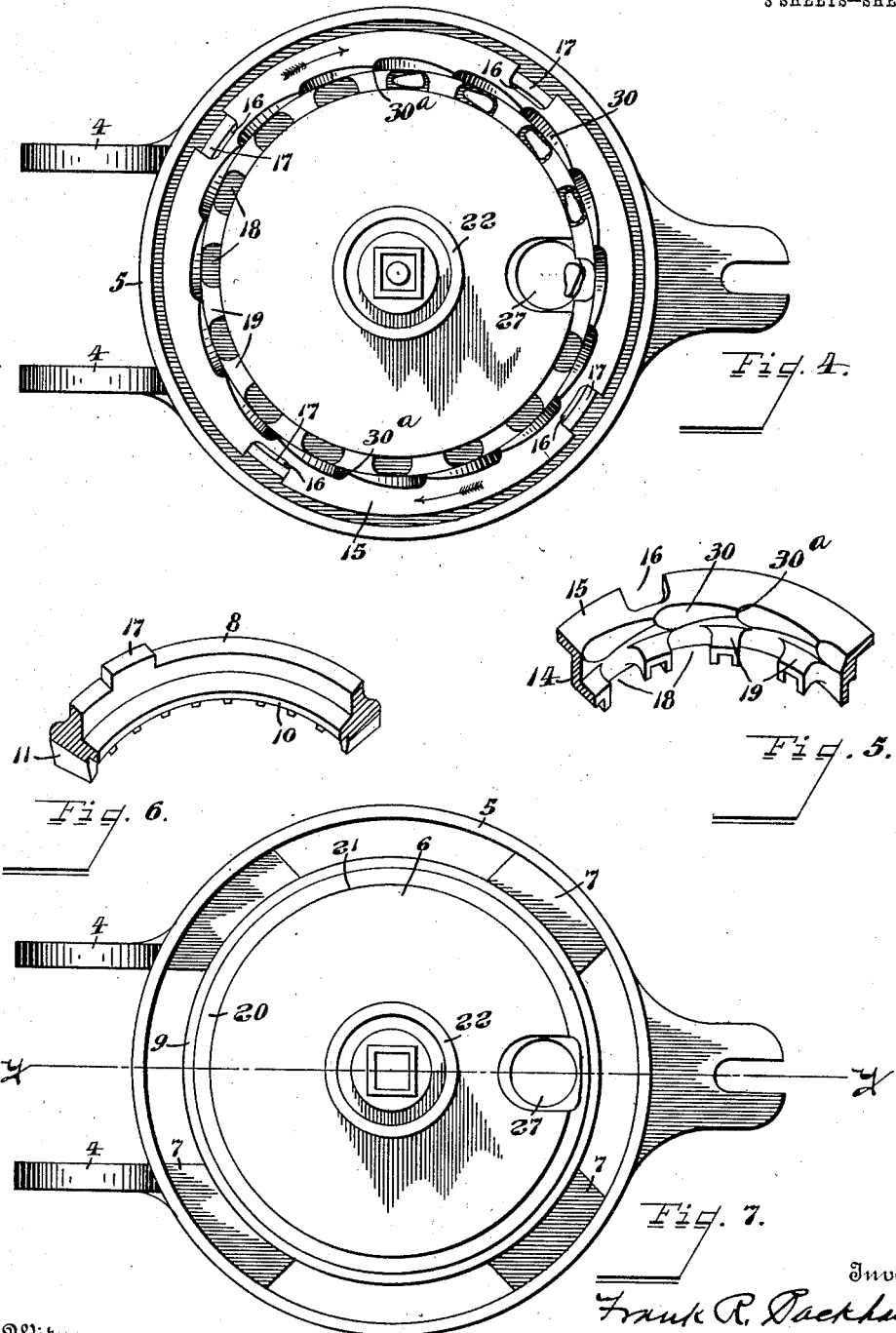

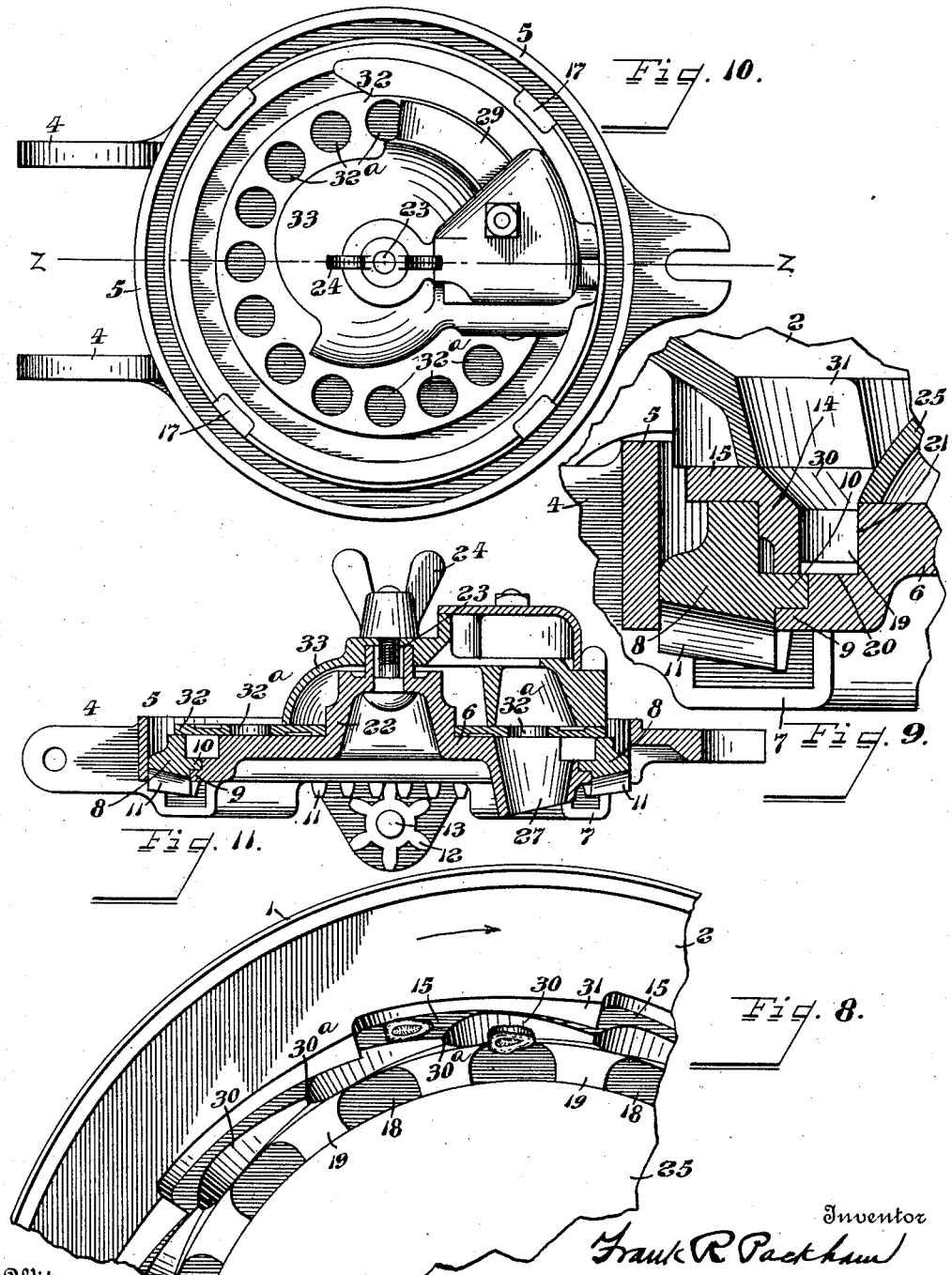

UNITED STATES PATENT OFFICE.

FRANK R. PACKHAM, OF SPRINGFIELD, OHIO, ASSIGNOR TO THE AMERICAN SEEDING MACHINE COMPANY, OF SPRINGFIELD, OHIO, A CORPORATION OF OHIO.

CORN-PLANTER.

1,016,766.  Specification of Letters Patent.  Patented Feb. 6, 1912.

Application filed June 30, 1911. Serial No. 636,157.

*To all whom it may concern:*

Be it known that I, FRANK R. PACKHAM, a citizen of the United States, residing at Springfield, in the county of Clark and State of Ohio, have invented certain new and useful Improvements in Corn-Planters, of which the following is a specification.

My invention relates to improvements in corn planters and it especially relates to the seed dropping devices therefor, and more particularly to those kind of seeding devices which employ an edge-drop seeding plate.

The object of my invention is to improve, simplify, and make more effective the operation of selecting, separating, and delivering a predetermined number of kernels to the planting devices of a corn planter, which kernels should be accumulated singly and deposited collectively in hills when the planter is being operated by check-row mechanism, or which may be both accumulated and deposited singly when drilling.

A further and more specific object of the invention is to provide improved means whereby the kernels may be agitated and brought into position longitudinally with the elongated seed cells of the seed plate and be placed into said cells upon their edges to be ejected inwardly toward the discharge opening after having passed the stationary center or inner retaining wall of said cells.

A further object of the invention is to provide a construction of seeding devices which, while particularly applicable for use in connection with an edge-drop seeding plate, may be also used in connection with flat seed plates which employ a series of round openings removed from the edge of the plate.

Figure 1:
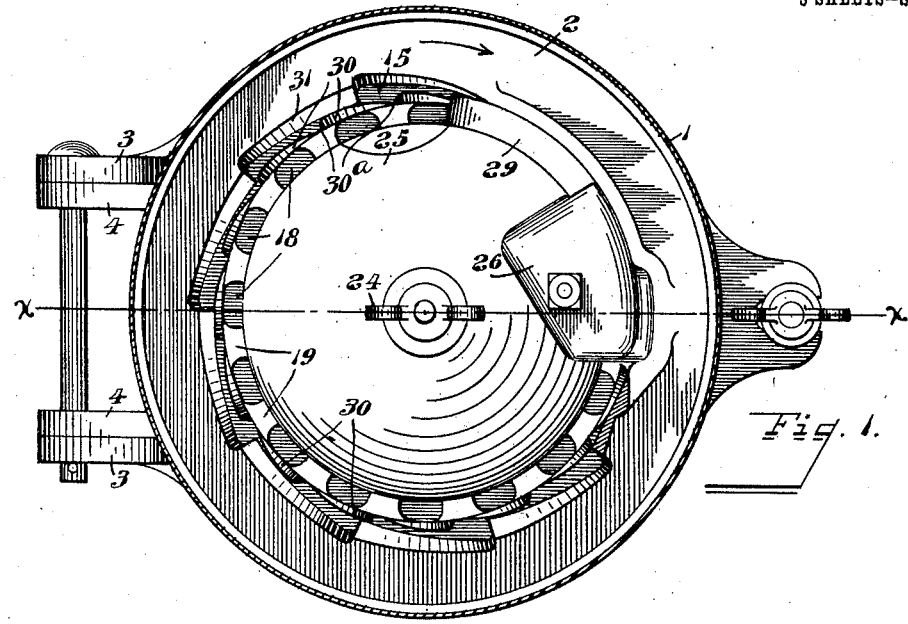
Figure 2:
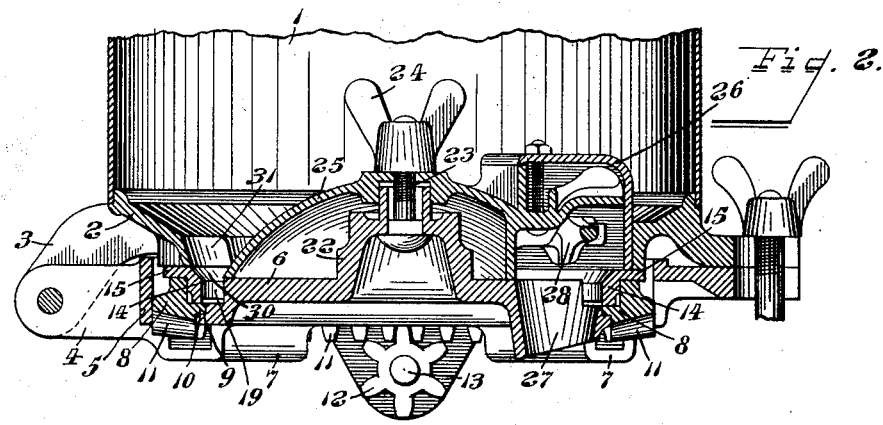
Figure 3:
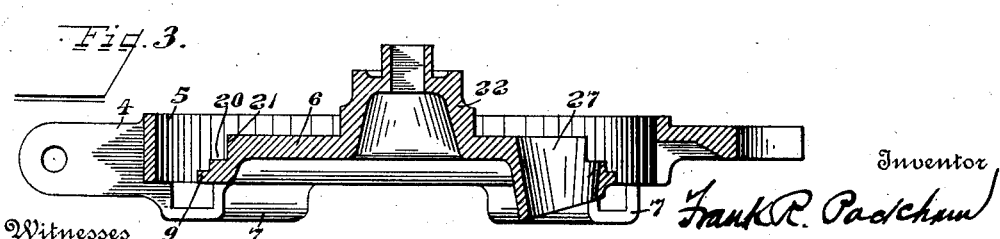

In the said drawings: Figure 1 is a top plan view of a seed hopper of a corn planter with the top removed, and of my improved seeding devices located therein. Fig. 2 is a vertical section on the line *x—x* of Fig. 1, the upper portion of the hopper being broken away. Fig. 3 is a section on the line *y—y* of Fig. 7 of the bottom plate of the hopper. Fig. 4 is a top plan view of the bottom plate of the hopper with the seed plate and operating gear ring for same in position thereon. Fig. 5 is a detail in perspective of a portion of the seed plate. Fig. 6 is a detail in perspective of a portion of the operating gear ring. Fig. 7 is a top plan view of the bottom plate of the hopper. Fig. 8 is an enlarged detail of a portion of the hopper ring and seed plate. Fig. 9 is an enlarged sectional view in detail of some of the parts shown in Fig. 2. Fig. 10 is a top plan view showing the devices in connection with a flat top seeding plate. Fig. 11 is a vertical section on the line *z—z* of Fig. 10.

Like parts are represented by similar characters of reference in the several views.

In the said drawings, 1 is the usual sheet metal hopper, the lower end of which is provided with an inclined open ring 2; this ring being of a peculiar construction which will be described more fully hereinafter. The hopper and its ring is hinged to a bottom support through the medium of a pair of ears 3 on the ring and a corresponding pair of ears 4 on said bottom support. The bottom support consists of an outer ring 5 and a central plate 6 supported from the ring 5 by depressed webs 7. The central plate 6 forms a support for the operating gear ring 8 and for that purpose is provided with a peripheral lower ledge 9 upon which the inwardly projecting flange 10 of said ring rests. This gear ring is provided in the usual way with teeth 11 which mesh with a pinion 12 on a rotating feed shaft 13, so that said gear ring will be given intermittent rotary movements when operated with check-row devices and a continuous rotary movement when drilling, as is usual in machines of this kind.

Located upon the flange 10 of the gear ring is the seed plate 14, the upper edge of which has an outwardly projecting peripheral flange 15 which lies over the top of the gear ring and is provided with a series of notches 16 which receive lugs 17 on said gear ring so as to cause said plate and ring to rotate together. The seed plate is provided with a series of seed cells 18 upon its inner periphery, these cells being formed by the inwardly extending depressed projections 19 on the plate proper 14. As shown in Figs. 2, 3 and 9 it will be seen that the central supporting plate 6 is shouldered out so as to form a peripheral ledge 20 and a peripheral wall 21 so that when the gear ring and seed plate are in position on said central plate the projections 19 which form the end of the seed cells overlie the ledge 20 and extend adjacent to the wall 21 so that said ledge 20 will form a stationary bottom for each of said cells and the wall 21 will form an inner stationary side for each of said cells; the top of said wall 21 substantially coinciding with the tops of the said cells, but the projections 19 which form the ends of the cells being slightly above the ledge to obviate friction.

Secured to the squared reduced end of the boss 22, extending upwardly from the center of the plate 6, through the medium of the bolt 23 and thumb-nut 24, is a dome-shaped cap 25, the outer edge of which coincides with the wall 21 of the plate 6. One side of this cap is provided with the usual housing 26, located over the seed discharge opening 27 in the side of the central plate 6, and containing the usual spring-pressed ejector 28 and having located at the entrance thereto the usual spring-pressed cutoff 29, which rests on the seed cells; this dome-shaped cap 25 and the inclined hopper ring 2 coöperating to form a gradually reduced passageway to the seed cells.

The seed plate 14, immediately above the cells proper, is provided with a series of notches or serrations 30, inclined toward the seed cells. Each of these serrations is gradually deepened in a direction reverse to that of the rotation of the seed plate so that the width of the flange 15 will be gradually narrowed above each cell in a rearward direction. The hopper ring 2 lies just above and caps the said plate so as to hold said plate in position on the gear ring. The inner side of the lower edge of the hopper ring is also provided with a series of notches or serrations 31 which are likewise deepened in a direction reverse to that of the rotation of the seed plate and also inclined toward the seed cells. The relation of the notches is such that in one position of rotation of the seed plate, whenever the upper edge of any one of the notches 30 is substantially coincident with the lower edge of one of the notches 31, as shown best in Fig. 8, the upper surface of the flange 15 of the seed plate opposite the deepest part of that particular notch 31 will be exposed, and the upper portion of the seed plate 15 immediately forward of that particular notch 30 will likewise be exposed because of the fact that it lies opposite the deepest part of the next succeeding notch 31. By this construction it will be seen that the inner edge of the flange 15 of the seed plate forms in effect a series of moving floors under the seed and that such seed as lodges on these moving floors will be swept off as they coincide with the beveled surface on the hopper ring formed by the notches 31, the construction being such that the kernels of corn will be upturned on their edges and caused to slide down the inclinations formed by the inclined surfaces or notches 30. Furthermore, the construction is such that in case kernels should become wedged between the hopper ring and the dome-shaped cap, the shoulders 30$^a$ formed at the juncture of the respective inclined surfaces or notches 30 will tend to up-heave said wedged kernels and dislodge them.

It will be seen that the discharge opening 27 in the central supporting plate 6 is extended for a considerable distance toward the center of the plate. The construction of this discharge opening not only makes a break in the bottom wall 20, but will throw open the entire inner side of each seed cell as it coincides therewith, so as to permit the more ready discharge of the seeds. It also provides for the use of a seeding plate of the flat top type such as illustrated in Figs. 10 and 11 and indicated by 32. The discharge opening 27 it will be seen extends through the entire thickness of the plate 6 so that the seed cells 32$^a$ in the plate 32 will coincide therewith as the seed plate revolves.

For the purpose of readily removing the edge-drop plate and inserting a plate of the flat top type, the cap 25 is made removable in the manner heretofore described. With the flat top plate a cap 33 of smaller dimensions is employed, as shown in Fig. 10 and Fig. 11. It will be understood that this flat top plate 32 and the gear ring 8 have interengaging parts to cause them to revolve together.

Having thus described my invention, I claim:

1. In a seed planter, a support, a gear ring, a peripheral ledge formed on said support to receive said gear ring, a seed plate rotatably connected to said gear ring, said seed plate being formed in the nature of an open ring having seed cells on its inner periphery, each of said seed cells being formed open at its top and bottom and also at its inner side, a second peripheral ledge on said support above said first ledge constituting a stationary bottom for said seed cells, a vertical wall formed by said support above said second ledge constituting an inner stationary for said seed cells, and an opening in said second ledge and wall for the discharge of the seed in said cells.

2. In a seed planter, a hopper, a seed plate in the nature of an open ring revolubly supported in said hopper, said seed plate having a series of depressed seed cells on its inner periphery, and inner and outer stationary inclined members in said hopper leading to said cells, said plate being beveled above said cells, said outer stationary member having a series of inclined serrations which temporarily expose portions of the top of said seed plate, substantially as and for the purpose specified.

3. In a seed planter, a hopper, a seed plate revolubly supported in said hopper, said plate having depressed interior seed cells, said plate above said cells being beveled to form inclinations toward said cells, said hopper having an inclined ring located about and capping the upper surface of said seed plate, and inclined serrations about the lower inner edge of said hopper ring, substantially as and for the purpose specified.

4. In a seed planter, a hopper, a seed plate revolubly supported in said hopper, said plate having a series of depressed seed cells, said seed plate being formed with a series of inclined serrations above said seed cells, and a hopper ring located above and capping said plate, the lower inner edge of said hopper ring also having a series of gradually deepened serrations.

5. In a seed planter, a hopper, a seed plate revolubly supported in said hopper, a ring in said hopper above and capping said plate, and a series of depressed seed cells in said plate, said plate above said cells being formed with a series of gradually deepened serrations, the lower edge of said hopper ring also having a series of gradually deepened serrations, said hopper ring serrations and seed plate serrations being adapted to lie coincident with each other at certain points in the revolution of said seed plate.

6. In a seed planter, a hopper, a seed plate revolubly supported in said hopper, said seed plate having depressed interior seed cells, a ring supported above and capping said seed plate, said seed plate having a series of serrations above said seed cells, said serrations being gradually deepened in a direction reverse to that of the rotation of said plate, said ring also having a series of serrations, said ring serrations being likewise gradually deepened in a direction reverse to that of the rotation of said plate, the respective serrations of said ring and plate being adapted to coincide at certain points in the revolution of said plate, substantially as and for the purpose specified.

7. In a seed planter, a hopper, a seed plate revolubly supported in said hopper, said seed plate having depressed interior seed cells, and an inclined ring supported above said seed plate, said seed plate having a series of serrations above said seed cells, each of said serrations being gradually deepened to as to form projecting shoulders between the same, said ring also having a series of gradually deepened serrations coöperating with said plate serrations, substantially as and for the purpose specified.

8. In a seed planter, a hopper, a seed plate revolubly supported in said hopper, said plate having a series of seed cells on its inner periphery, and a stationary member located above said plate and capping a portion of the same, the inner periphery of said member being provided with a series of projections which terminate at points adjacent the outer walls of said seed cells, substantially as and for the purpose specified.

9. In a seed planter, a hopper, a seed plate revolubly supported in said hopper, said plate having a series of seed cells on its inner periphery, the said plate adjacent said cells being formed with serrations inclined toward said cells, a stationary inclined member located above said plate and capping a portion of the same, the edge of said member being formed with projections coöperating with the serrations of said plate whereby said plate will form moving disappearing floors, substantially as and for the purpose specified.

10. In a seed planter, a hopper, a seed plate revolubly supported in said hopper, said plate having a series of seed cells on its inner periphery, a stationary member located above said plate and capping a portion of the same, and a series of projections arranged about said stationary member at points adjacent to the outer walls of said seed cells with the inner face of each of said projections inclined away from the walls of said cells.

In testimony whereof, I have hereunto set my hand this 27th day of June, 1911.

FRANK R. PACKHAM.

Witnesses:
 Roy H. Kipp,
 Chas. I. Welch.

---

Copies of this patent may be obtained for five cents each, by addressing the "Commissioner of Patents, Washington, D. C."